United States Patent Office 3,462,467
Patented Aug. 19, 1969

3,462,467
17α-PHENYLALKYL/PHENYLETHYNYL/PHENYL-VINYL-13β-ALKYLGONA - 1,3,5(10)-TRIENE-3,17β-DIOLS AND ESTERS THEREOF
Paul D. Klimstra, Northbrook, Ill., assignor to G. D. Searle & Co., a corporation of Delaware
No Drawing. Filed May 1, 1967, Ser. No. 634,820
Int. Cl. C07c 169/08, 167/20; A61k 17/06
U.S. Cl. 260—397.5                              12 Claims

ABSTRACT OF THE DISCLOSURE

Novel steroidal derivatives characterized by a phenyl-containing hydrocarbon substituent at the 17-position and a 13β-alkyl group of at least two carbon atoms and useful as estrogenic agents with corresponding lack of antiestrogenic side effects. They are, furthermore, hypocholesterolemic, pepsin-inhibitory and antifertility agents. These novel compounds are prepared by addition of the appropriate organometallic reagent to the corresponding 17-keto starting materials or, alternatively, in the case of the 17-phenylvinyl or 17α-phenylethyl derivatives, by partial or complete reduction of the acetylenic linkage of the instant 17-phenylethynyl substances. Acylation with a suitable alkanoic acid anhydride or halide provides the corresponding esters.

The present invention is concerned with novel steroidal derivatives characterized by a phenyl-containing hydrocarbon substituent at the 17-position and a 13β-alkyl group of at least two carbon atoms and, more particularly, with 17α-phenylalkyl/phenylethynyl/phenylvinyl - 13β-alkylgona-1,3,5(10)-triene-3,17β-diols and esters thereof represented by the following structural formula

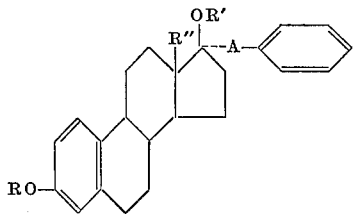

wherein R and R' are selected from the group consisting of hydrogen and a lower alkanoyl radical, R" is a lower alkyl radical containing more than one carbon atom and A is a lower alkylene, vinylene or ethynylene radical.

The lower alkyl radicals symbolized by the R" term are typified by ethyl, propyl, butyl, pentyl, hexyl, heptyl and the branched-chain radicals thereof.

Representative lower alkylene radicals embraced by the A term are ethylene, trimethylene, tetramethylene, pentamethylene and the corresponding branched-chain groups.

The term lower alkanoyl embraces radicals of the formula

wherein X is hydrogen or a lower alkyl radical as hereinbefore defined.

The compounds of this invention are conveniently manufactured by processes which utilize as starting materials compounds of the following structural formula

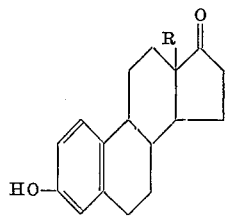

wherein R" is a lower alkyl radical containing more than one carbon atom. When those substances are allowed to react with the appropriate organometallic reagent, the corresponding instant 17α-(hydrocarbon-substituted)-17β-ols are produced. A specific example is the reaction of dl-13β-ethyl-3-hydroxygona-1,3,5(10)-triene-17-one with benzyl magnesium chloride in ether, thus affording dl-17α-benzyl-13β-ethylgona-1,3,5(10)-triene-3,17β-diol.

An alternative method for preparation of the instant 17α-phenylvinyl or 17α-phenylethyl compounds involves, respectively, partial or complete reduction of the acetylenic linkage of the corresponding 17α-phenylethynyl substances. An example of partial reduction is the hydrogenation of dl - 13β - ethyl - 17α - phenylethynylgona-1,3,5(10)-triene-3,17β-diol in pyridine in the presence of 5% palladium-on-carbon catalyst, thus affording dl-13β-ethyl-17α-phenylvinylgona - 1,3,5(10)-triene - 3,17β-diol. When that hydrogenation process is conducted in a neutral solvent such as ethanol, complete saturation of the acetylenic bond occurs to yield dl-13β-ethyl-17α-phenylethylgona-1,3,5(10)-triene-3,17β-diol.

Acylation of the instant diols with a lower alkanoic acid anhydride or halide, preferably in the presence of a suitable acid acceptor such as pyridine or triethylamine, at or near room temperature affords the corresponding 3-mono-(lower alkanoates). The 3,17-bis-(lower alkanoates) are produced when that process is conducted at elevated temperature, suitably at 90–100°. At room temperature, dl-17α-benzyl-13β - ethylgona-1,3,5(10)-triene - 3,17β-diol, when contacted with acetic anhydride and pyridine, thus affords the corresponding 3-acetate, while at 90–100° the 3,17-diacetate is produced.

The novel compounds of this invention display valuable pharmacological properties. They possess, for example, estrogenic, hypocholesterolemic, pepsin-inhibitory and antifertility activity and exhibit the particular advantage of lacking antiestrogenic side effects. These substances can be administered in any of a number of conventional pharmaceutical forms and also by conventional routes. For oral administration suitable solid forms are pills, powders, capsules, tablets or the like, and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the estrogenic response produced in immature female mice injected subcutaneously with corn oil solutions of dl-17α-benzyl-13β-ethylgona-1,3,5(10)-triene-3,17β-diol over a period of three days at total doses varying between 0.03 and 1.0 mg. per mouse. As compared to the standard, i.e., subcutaneously administered estrone, this compound possesses a potency of 0.53%.

The compounds of this invention are obtained as dl-mixtures. Resolution to afford the individual d and l enantiomorphs is conveniently achieved by esterification with a suitable dibasic acid anhydride such as phthalic or succinic anhydride followed by salt formation between the resulting acid ester and a suitable optically active amine such as brucine, morphine, quinine, quinidine, strychnine, etc., separation of the resulting salts, basification to yield the respective acid esters and hydrolysis to produce the desired d and l forms of the instant hydroxy compounds.

The invention will appear in further detail from a consideration of the following examples. These examples are given for the purpose of illustration only and are not to be construed as limiting the invention either in spirit or in scope. In these examples temperatures are given in degrees centigrade (° C.) and materials in parts by weight unless otherwise noted.

EXAMPLE 1

To a mixture of 5.4 parts of magnesium metal turnings with 70 parts of ether is added dropwise, over a period of about 40 minutes at the reflux temperature, a solution of 28.2 parts of benzyl chloride in 175 parts of ether. A crystal of iodine is added in order to initiate the reaction, after which time the mixture is cooled. Refluxing is continued for about 30 minutes longer, at the end of which time a solution of 10 parts of dl-13β-ethyl-3-hydroxygona-1,3,5(10)-trien-17-one in 150 parts of tetrahydrofuran is added over a period of about 15 minutes. This reaction mixture is heated at the reflux temperature for about 16 hours, at the end of which time a solution of 10 parts of ammonium chloride in 55 parts of water is added dropwise. The tetrahydrofuran layer is separated by decantation and anhydrous sodium sulfate together with fresh tetrahydrofuran is added to the aqueous layer. The organic layer is again decanted and the combined organic solutions are evaporated to dryness to afford the crude product as a solid residue. Recrystallization of that crude material from acetone-hexane affords pure dl-17α-benzyl-13β-ethyl-gona-1,3,5(10)-triene-3,17β-diol, melting at about 228–230°. This compound is represented by the following structural formula

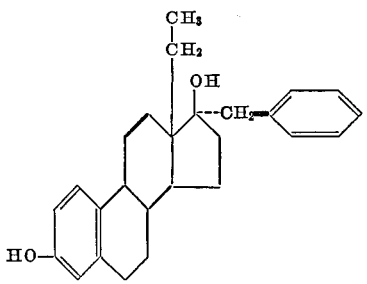

EXAMPLE 2

To a mixture of 2.2 parts of metallic sodium with 67 parts of tetrahydrofuran are added dropwise, with stirring and warming over a period of about 1 hour, 13 parts of phenylacetylene. That mixture is heated at the reflux temperature for about 1 hour, at the end of which time a solution of 7 parts of dl-13β-ethyl-3-hydroxygona-1,3,5(10)-trien-17-one in 158 parts of tetrahydrofuran is added dropwise over a period of about 1 hour. The reaction mixture which results is heated at the reflux temperature for about 24 hours, then is cooled and 6 parts of water is added carefully. The resulting mixture is poured into ice and water containing 12 parts of concentrated hydrochloric acid. This acidic mixture is extracted with ether, and the ether layer is separated, washed successively with water and dilute aqueous sodium bicarbonate, then dried over anhydrous sodium sulfate containing decolorizing carbon. Removal of the solvent by distillation under reduced pressure affords a dark oily residue which partially solidifies upon standing. Trituration of that material with benzene results in a pale yellow solid which is collected by filtration, then purified by recrystallization from benzene-ethyl acetate to yield pure dl-13β-ethyl-17α-phenylethynylgona-1,3,5(10)-triene-3,17β-diol, melting at about 140–143° and represented by the following structural formula

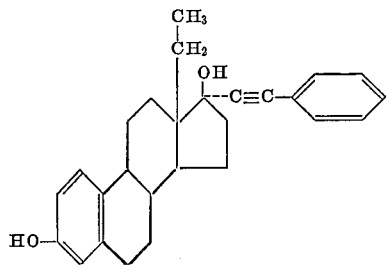

EXAMPLE 3

A solution containing 5 parts of dl-13β-ethyl-17α-benzyl-gona-1,3,5(10)-triene-3,17β-diol, 23 parts of acetic anhydride and 45 parts of pyridine is allowed to stand at room temperature for about 16 hours, then is poured carefully into water, and the resulting aqueous mixture is stirred for about 30 minutes, then is cooled at 0–5°. The initially oily product which solidifies during this time is separated mechanically from the mixture. Extraction of that solid product with ether affords an organic solution, which is washed successively with water, dilute hydrochloric acid and dilute aqueous sodium bicarbonate, then dried over anhydrous sodium sulfate and stripped of solvent by distillation under reduced pressure. The solid crude product which remains is purified by recrystallization from acetone-hexane to yield pure dl-17α-benzyl-13β-ethylgona-1,3,5(10)-triene-3,17β-diol 3-acetate, which melts at about 181–183° and exhibits an optical rotation, in chloroform, of −0.5°. It is represented by the following structural formula

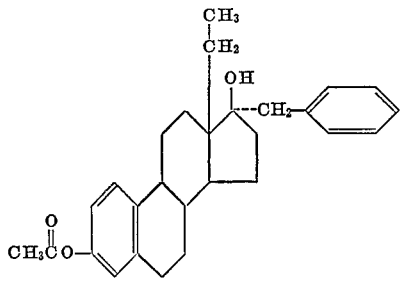

EXAMPLE 4

When the procedure of Example 3 is repeated with an equivalent quantity of propionic anhydride substituted for acetic anhydride, there is produced dl-17α-benzyl-13β-ethylgona-1,3,5(10)-triene-3,17β-diol 3-propionate.

EXAMPLE 5

A mixture containing 1 part of dl-17α-benzyl-13β-ethylgona-1,3,5(10)-triene-3,17β-diol, 5 parts of acetic anhydride and 10 parts of pyridine is heated and stirred at the reflux temperature for about 6 hours, then is cooled and poured carefully into a mixture of ice and water. The resulting mixture is extracted with ether and the ether layer is washed successively with water, dilute hydrochloric acid and dilute aqueous sodium bicarbonate, then is dried and decolorized by means of a mixture containing anhydrous sodium sulfate and decolorizing carbon. Removal of the solvent by distillation under reduced pressure affords the crude product, which is purified by recrystallization from aqueous methanol to yield dl-17α-benzyl - 13β-ethylgona-1,3,5(10)-triene-3,17β-diol 3,17-diacetate.

EXAMPLE 6

By substituting an equivalent quantity of propionic anhydride and otherwise proceeding according to the processes described in Example 5, there is obtained dl-17α-benzyl - 13β-ethylgona-1,3,5(10)-triene-3,17β-diol 3,17-dipropionate.

EXAMPLE 7

When an equivalent quantity of dl-13β-n-butyl-3-hydroxygona-1,3,5(10)-trien-17-one is substituted in the procedure of Example 1, there is produced dl-13β-n-butyl-17α-benzylgona-1,3,5(10)-triene-3,17β-diol.

EXAMPLE 8

A reaction mixture consisting of 7.5 parts of dl-13β-ethyl - 17α-phenylethynylgona-1,3,5(10)-triene-3,17β-diol, 70 parts of acetic anhydride and 130 parts of pyridine is allowed to stand at room temperature for about 7 hours, then is diluted with water and cooled. The resulting aqueous mixture is extracted with ether, and the organic layer is separated, washed successively with water, dilute hydrochloric acid and dilute aqueous sodium bicarbonate, then dried over anhydrous sodium sulfate containing decolorizing carbon. Removal of the solvent by distillation under reduced pressure affords a glass-like residue of the crude product, which is purified by the recrystallization from aqueous methanol to yield solvated dl - 13β - ethyl - 17α-phenylethynylgona - 1,3,5(10)-triene-3,17β-diol 3-acetate, which melts at about 82–85°. This compound is represented by the following structural formula

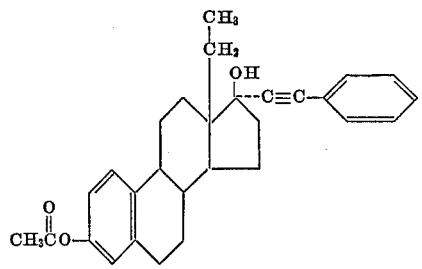

EXAMPLE 9

To a solution of 1 part of dl-13β-ethyl-17α-phenylethynylgona - 1,3,5(10) - triene - 3,17β-diol in 40 parts of pyridine is added 0.1 part of 5% palladium-on-carbon catalyst, and that reaction mixture is shaken with hydrogen at atmospheric pressure and room temperature for about 90 minutes until one molecular equivalent of hydrogen has been absorbed. The catalyst is removed by filtration, and the filtrate is diluted with a large quantity of water, then extracted with ether. The ether layer is separated, washed successively with dilute hydrochloric acid and dilute aqueous sodium bicarbonate, then dried over anhydrous potassium carbonate containing decolorizing carbon. Removal of the solvent by distillation under reduced pressure affords an oily residue, which is purified by crystallization from aqueous methanol to yield needle-like crystals of solvated dl - 13β - ethyl - 17α-phenylvinylgona-1,3,5(10)-triene-3,17β-diol, melting at about 92–94°.

EXAMPLE 10

To a solution of 8 parts of dl-13β-ethyl-17α-phenylethynylgona-1,3,5(10)-triene-3,17β-diol in 320 parts of ethanol is added 0.8 part of 5% palladium-on-carbon catalyst, and the resulting reaction mixture is shaken with hydrogen at atmospheric pressure and room temperature until two molecular equivalents of hydrogen have been absorbed. Removal of the catalyst by filtration affords a filtrate, which is poured into mixture of ice and water. The reaction mixture is extracted with chloroform, and the organic layer is separated, washed with water, dried over anhydrous potassium carbonate and concentrated to dryness by distillation under reduced pressure. The resulting crude product is purified by recrystallization from actone-hexane to yield dl-13β - ethyl - 17α-phenylethylgona-1,3,5(10)-triene-3,17β-diol.

EXAMPLE 11

By substituting an equivalent quantity of dl-13β-n-butyl-3-hydroxygona-1,3,5(10)-trien-17-one and otherwise proceeding according to the processes described in Example 2, there is produced dl-13β-n-butyl-17α-phenylethynylgona-1,3,5(10)-triene-3,17β-diol.

EXAMPLE 12

The reduction of an equivalent quantity of dl-13β-n-butyl-17α-phenylethynylgona-1,3,5(10) - triene-3,17β-diol by the procedure described in Example 10 results in dl-13β-n-butyl-17α-phenylethylgona-1,3,5(10) - triene-3,17β-diol.

EXAMPLE 13

The substitution of an equivalent quantity of dl-13β-ethyl-17α-phenylvinylgona-1,3,5(10)-triene-3,17β-diol in the procedure of Example 3 results in dl-13β-ethyl-17α-phenylvinylgona-1,3,5(10)-triene-3,17β-diol 3-acetate.

EXAMPLE 14

By substituting an equivalent quantity of dl-13β-n-butyl-17α-benzylgona-1,3,5(10) - triene - 3,17β-diol and otherwise proceeding according to the processes described in Example 3, there is obtained dl-13β-n-butyl-17α-benzylgona-1,3,5(10)-triene-3,17β-diol 3-acetate.

EXAMPLE 15

When an equivalent quantity of dl-13β-n-butyl-17α-phenylethynylgona-1,3,5(10)-triene-3,17β-diol is substituted in the procedure of Example 3, there is produced dl-13β-n-butyl-17α-phenylethynylgona-1,3,5(10) - triene-3,17β-diol 3-acetate.

EXAMPLE 16

Acylation of an equivalent quantity of dl-13β-n-butyl-17α-phenylvinylgona-1,3,5(10)-triene-3,17β-diol according to the procedure described in Example 3 results in dl-13β-n-butyl-17α-phenylvinylgona-1,3,5(10) - triene-3,17β-diol 3-acetate.

EXAMPLE 17

The substitution of equivalent quantites of dl-13β-n-butyl-17α-benzylgona-1,3,5(10)-triene-3,17β-diol and propionic anhydride in the procedure of Example 3 results in dl-13β-n-butyl-17α-benzylgona - 1,3,5(10) - triene-3,17β-diol 3-propionate.

What is claimed is:
1. A compound of the formula

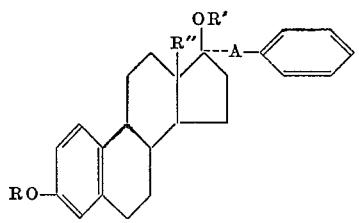

wherein R and R' are selected from the group consisting of hydrogen and lower alkanoyl radicals, R" is a lower alkyl radical containing more than one carbon atom and A is a member of the class consisting of vinylene, ethynylene and lower alkylene radicals.

2. As in claim 1, a compound of the formula

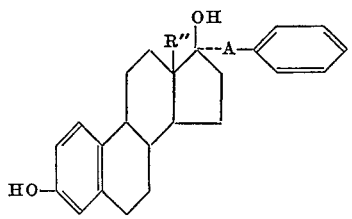

wherein R" is a lower alkyl radical containing more than one carbon atom and A is a member of the class consisting of vinylene, ethynylene and lower alkylene radicals.

3. As in claim 1, a compound of the formula

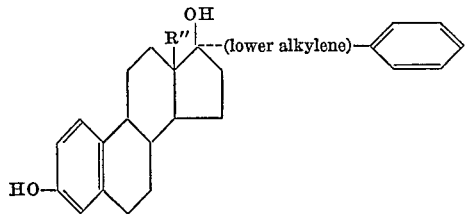

wherein R" is a lower alkyl radical containing more than one carbon atom.

4. As in claim 1, a compound of the formula

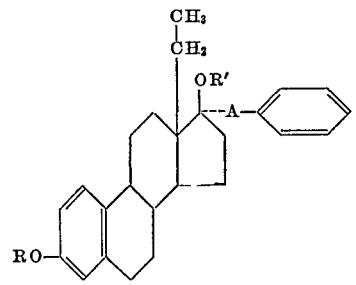

wherein R and R' are selected from the group consisting of hydrogen and lower alkanoyl radicals and A is a member of the class consisting of lower alkylene, vinylene and ethynylene radicals.

5. As in claim 1, a compound of the formula

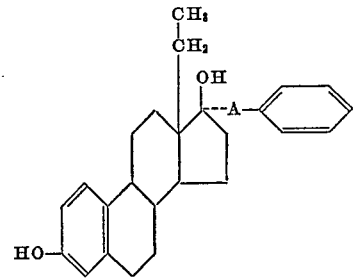

wherein A is a member of the class consisting of lower alkylene, vinylene and ethynylene radicals.

6. As in claim 1, a compound of the formula

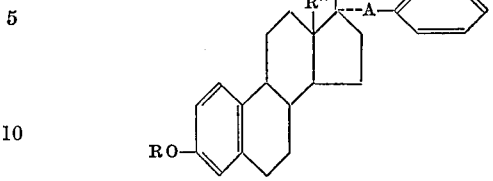

wherein R is selected from the group consisting of hydrogen and a lower alkanoyl radical, R" is a lower alkyl radical and A is selected from the group consisting of lower alkylene, vinylene, and ethynylene radicals.

7. As in claim 1, a compound of the formula

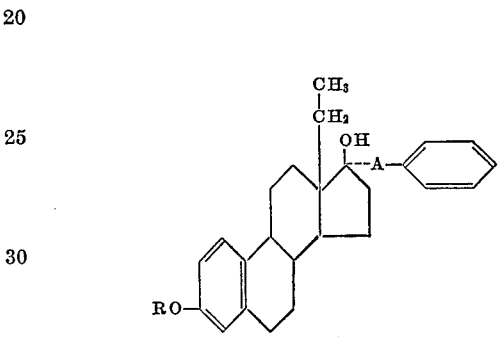

wherein R is a member of the class consisting of hydrogen and a lower alkanoyl radical and A is selected from the group consisting of lower alkylene, vinylene and ethynylene radicals.

8. As in claim 1, the compound which is 17α-benzyl-13β-ethylgona-1,3,5(10)-triene-3,17β-diol.

9. As in claim 1, the compound which is 17α-benzyl-13β-ethylgona-1,3,5(10)-triene-3,17β-diol 3-acetate.

10. As in claim 1, the compound which is 17α-phenylethynyl-13β-ethylgona-1,3,5(10)-triene-3,17β-diol.

11. As in claim 1, the compound which is 13β-ethyl-17α-phenylethynylgona-1,3,5(10)-triene-3,17β-diol 3-acetate.

12. As in claim 1, the compound which is 13β-ethyl-17α-phenylvinylgona-1,3,5(10)-triene-3,17β-diol .

No references cited.

ELBERT L. ROBERTS, Primary Examiner

U.S. Cl. X.R.
424—238